US010982750B2

(12) United States Patent
Lawson et al.

(10) Patent No.: US 10,982,750 B2
(45) Date of Patent: Apr. 20, 2021

(54) RETENTION SYSTEM

(71) Applicant: Dana Automotive Systems Group, LLC, Maumee, OH (US)

(72) Inventors: Mitchell R. Lawson, Perrysburg, OH (US); Brian S. Longardner, Sylvania, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 16/587,097

(22) Filed: Sep. 30, 2019

(65) Prior Publication Data
US 2020/0103017 A1  Apr. 2, 2020

Related U.S. Application Data

(60) Provisional application No. 62/739,404, filed on Oct. 1, 2018.

(51) Int. Cl.
*F16H 57/025* (2012.01)
*F16H 57/037* (2012.01)
*F16H 48/38* (2012.01)
*F16H 57/02* (2012.01)

(52) U.S. Cl.
CPC ......... *F16H 57/025* (2013.01); *F16H 57/037* (2013.01); *F16H 48/38* (2013.01); *F16H 2057/02043* (2013.01)

(58) Field of Classification Search
CPC ...... F16H 57/025; F16H 57/037; F16H 48/38; F16H 2057/02043
See application file for complete search history.

(56) References Cited

U.S. PATENT DOCUMENTS

| 5,735,375 | A | * | 4/1998 | Booth | F16D 27/112 |
| | | | | | 148/218 |
| 7,004,297 | B2 | * | 2/2006 | Ando | F16D 27/115 |
| | | | | | 192/107 M |
| 8,591,375 | B2 | | 11/2013 | Maruyama | |
| 8,801,561 | B1 | | 8/2014 | Kii | |
| 9,500,268 | B2 | | 11/2016 | Balenda, II | |
| 9,625,026 | B2 | | 4/2017 | Cochren | |
| 9,695,922 | B2 | * | 7/2017 | Yamanaka | F16H 48/34 |
| 2002/0132693 | A1 | * | 9/2002 | Forrest | F16H 48/22 |
| | | | | | 475/150 |
| 2008/0009381 | A1 | * | 1/2008 | Sudou | F16H 48/24 |
| | | | | | 475/231 |

(Continued)

FOREIGN PATENT DOCUMENTS

FR          3016075 A1 *  7/2015  ............ G21C 7/12

*Primary Examiner* — Vicky A Johnson
(74) *Attorney, Agent, or Firm* — Marshall & Melhorn, LLC

(57) ABSTRACT

System for securing a part in a vehicle differential housing may have a differential housing having an interior wall and an exterior wall. The interior wall defines a cavity within the housing. The system may also have an axially inwardly extending feature integrally formed, unitary and one piece with the differential housing interior wall. The feature may define a first arm extending parallel a portion of the interior wall adjacent where the feature is connected to the interior wall. The feature may define a second arm extending transverse the first arm and a third arm extending transverse the second arm. A non-magnetic material may cover an end portion of the third arm.

17 Claims, 3 Drawing Sheets

(56) References Cited

U.S. PATENT DOCUMENTS

| | | |
|---|---|---|
| 2011/0136610 A1 | 6/2011 | Gianone |
| 2012/0190493 A1* | 7/2012 | Tamoto ................ B60K 17/351 |
| | | 475/87 |
| 2016/0223064 A1 | 8/2016 | Yamanaka |
| 2020/0103017 A1* | 4/2020 | Lawson ................ F16H 57/037 |

* cited by examiner

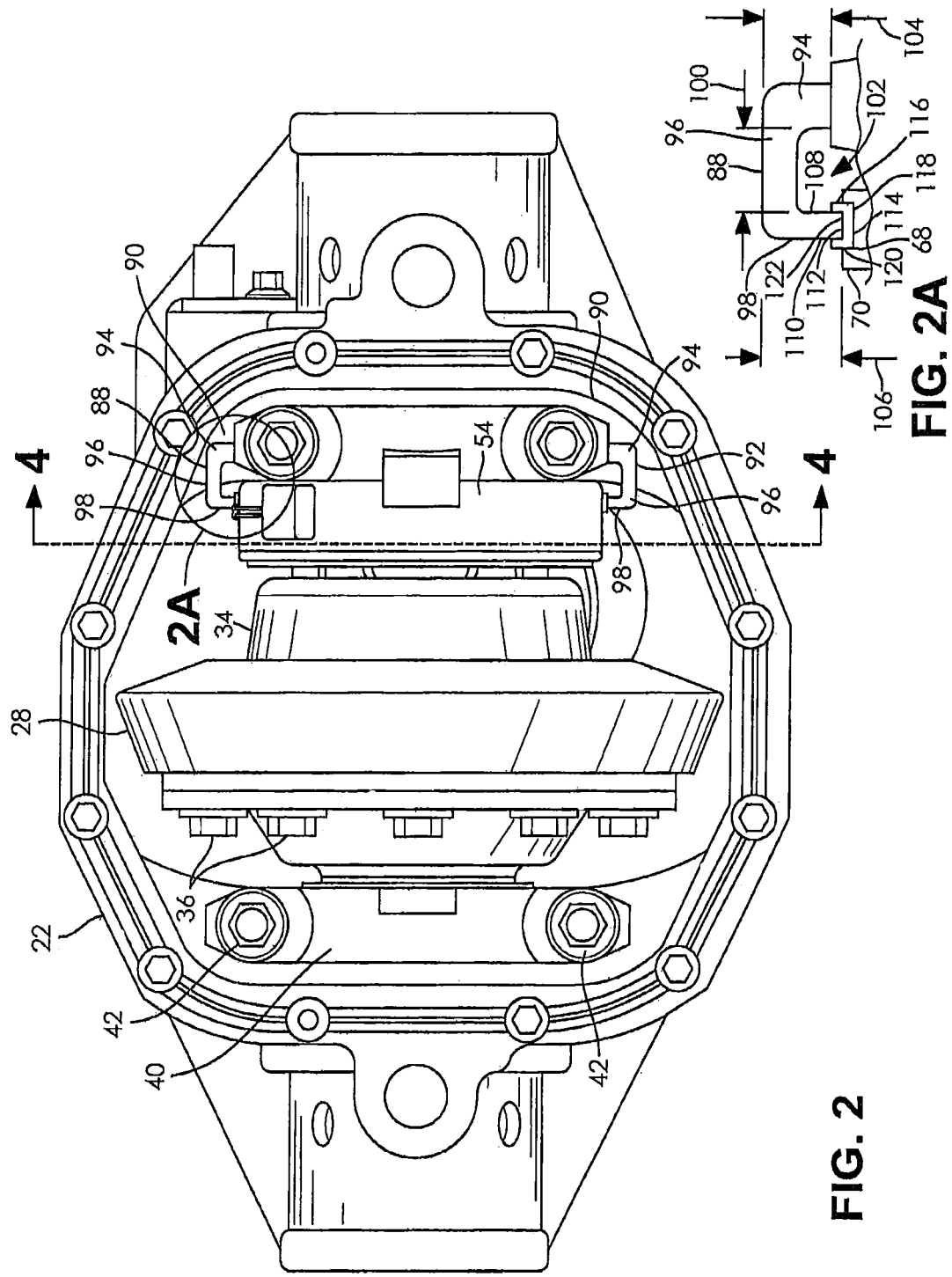

RETENTION SYSTEM

CROSS-REFERENCE TO RELATED APPLICATION

The present patent application claims the benefit of U.S. Provisional Patent Application No. 62/739,404, filed Oct. 1, 2018, which is fully incorporated herein by reference in its entirety.

FIELD

The present system relates to securing a part in a vehicle differential housing. More particularly, the system may relate to securing an actuating component within a differential housing for a vehicle.

BACKGROUND

Differentials are well known devices that divide torque between two axle half shafts. In some instances, it is preferred that the differential be locked so that torque is equally split between the two axle half shafts. Various methods have been used to lock the differential including electromagnetic solenoids. The electromagnetic solenoid may be energized to selectively move a gear, or other member, into one of the differential gears to lock the differential.

It has been found that the prior art electromagnetic solenoids are not adequately secured within the differential housing. Without being locked into place, the electromagnetic solenoids can shift, such as in the axial direction. Any axial shift can result in a change in performance of the system. By way of one example, an axial shift can make it so that the gear or other member connecting the electromagnetic solenoid with the differential can no longer engage the differential.

In view of the disadvantages of the known prior art systems, it would be advantageous for a system to have a structure to retain the electromagnetic solenoid in a secure location so that system can function properly.

SUMMARY

In concordance and agreement with the present disclosure, a system to have a structure to retain the electromagnetic solenoid in a secure location so that system can function properly, has surprisingly been discovered.

The present disclosure provides for a retention system. In one embodiment, the retention system, comprises: at least one mounting structure having at least one feature provided therewith; and a component configured to cooperate with the at least one feature to maintain a position of at least a portion of the component relative to the at least one mounting structure.

In another aspect, the retention system further comprises a non-magnetic material disposed between the at least one mounting structure and the component.

In another aspect, the at least one mounting structure is a differential housing.

In another aspect, the at least one mounting structure is a bearing cap.

In another aspect, the component is an electromagnetic solenoid of a coupling mechanism.

In another aspect, the at least one feature has a generally C-shaped cross-section.

In another aspect, the at least one feature includes a first arm, a second arm, and a third arm.

In another aspect, the first arm extends parallel a portion of the at least one mounting structure adjacent where the at least one feature is connected thereto.

In another aspect, the second arm extends transverse at least one of the first arm and the third arm of the at least one feature.

In another aspect, at least one of the arms of the at least one feature includes a non-magnetic material covering an end portion thereof.

In another aspect, the first and third arms of the at least one feature are parallel one another and extend in the same direction.

In another aspect, the first arm has a first length and the third arm has a length less than the first length.

In another aspect, the third arm is separated from the first arm by the second arm having a gap formed therebetween.

In another aspect, the third arm and the first arm of the at least one feature partially overlap one another in an axial direction.

In another aspect, the third arm of the at least one feature has an inner side facing the first arm and an outer side opposite the inner side.

In another aspect, the inner side and the outer side of the third arm define a constant thickness.

In another aspect, the non-magnetic material has a generally C-shaped cross-section.

In another aspect, the non-magnetic material includes a first leg, a second leg, and a third leg.

In another aspect, the component includes a housing having a groove formed therein.

In another aspect, the groove is configured to cooperate with the at least one feature of the mounting structure.

BRIEF DESCRIPTION OF THE DRAWINGS

The above, as well as other advantages, will become readily apparent to those skilled in the art from the following detailed description when considered in the light of the accompanying drawings in which:

FIG. 2 is a rear elevational view of the driveline system of FIG. 1;

FIG. 2A is an enlarged detail rear view of a portion of the driveline system shown within circle 2A of FIG. 2;

DETAILED DESCRIPTION

It is to be understood that the system may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
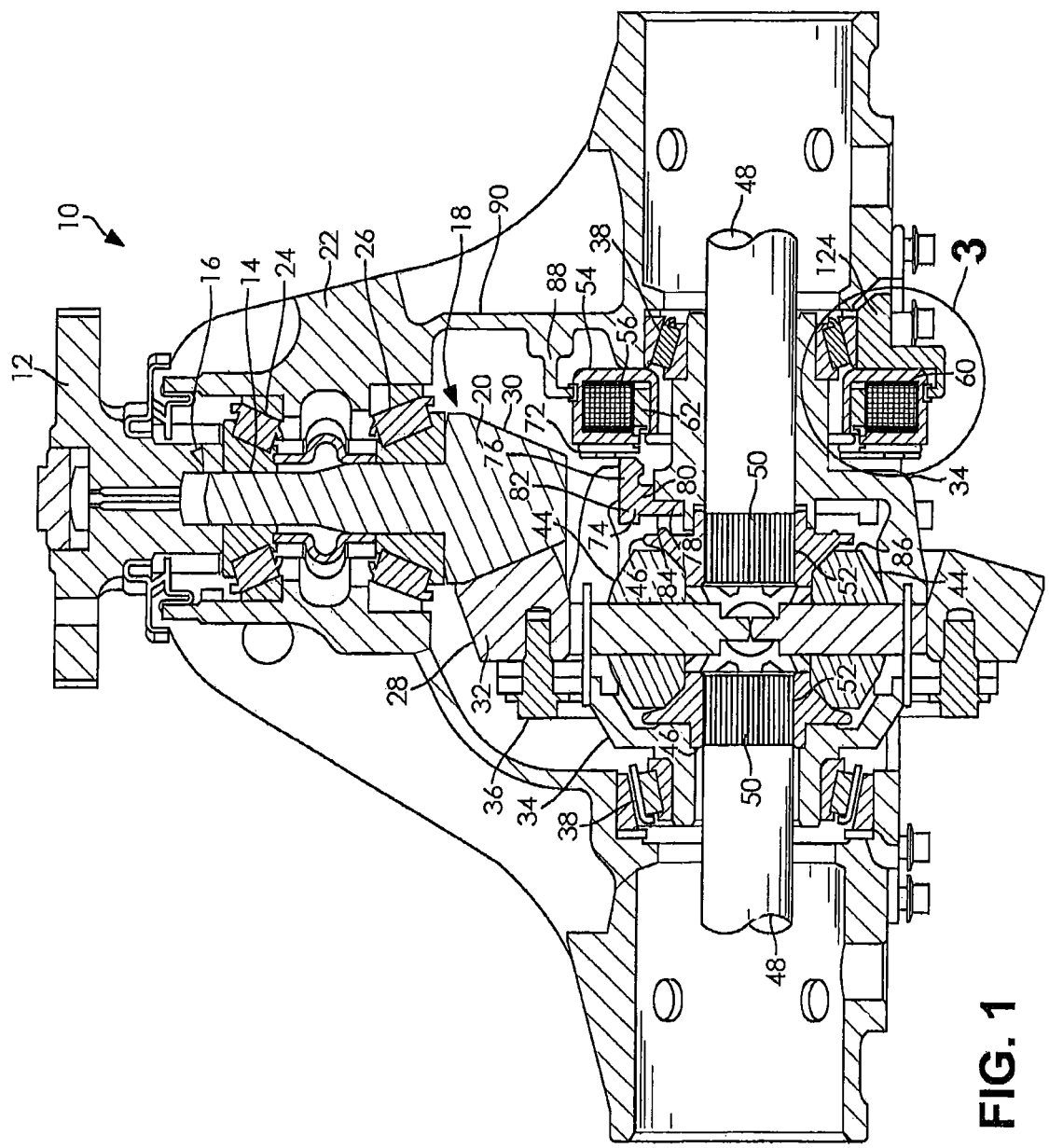
FIG. 1 is a top plan view of an embodiment of a driveline system, wherein at least a portion of thereof is in section.

Turning now to FIG. 1, one embodiment of a portion of a vehicle driveline 10 is depicted. The driveline 10 may be comprised of an input yoke 12. The input yoke 12 is connected to a source of rotation (not shown), such as an engine, a motor, a motor-generator, a shaft connected to one of them, or other power source, for example. The yoke 12 shown may be drivingly connected to a differential pinion shaft 14. More particularly, the yoke 12 is connected by splines (not shown) at an input end 16 of the differential pinion shaft 14. An output end 18 of the pinion shaft 14 is provided with a pinion shaft gear 20.

The rotatable differential pinion shaft 14 is supported within a stationary differential housing 22 by at least a first bearing 24. As shown in FIG. 1, the differential pinion shaft 14 is mounted on the first bearing 24 as well as a second bearing 26.

The pinion shaft gear 20 is meshed with a differential ring gear 28. More particularly, gear teeth 30 of the pinion shaft gear 20 are meshed with gear teeth 32 on the differential ring gear 28 so that rotation from the pinion shaft 14 is transferred directly to the ring gear 28.

The ring gear 28 is attached to a differential case 34. In the depicted embodiment, the ring gear 28 is attached to the differential case 34 with mechanical fasteners 36, but other connections are permissible, such as welding.

The differential case 34 may be such as a two piece differential case 34. The case 34 may be held together with the fasteners 36 that attach the ring gear 28 to the case 34. The case 34 is mounted for rotation within the differential housing 22 with bearing rings 38. The caps 40 for retaining the bearing rings 38 are shown in FIG. 2. The caps 40 may be secured to the housing 22, such as through mechanical fasteners 42.

The differential case 34 may have differential pinion gears 44 and differential side gears 46 in mesh with one another. In the depicted embodiment, there are two differential pinion gears 44 and two differential side gears 46. Axle half shafts 48 are connected, such as by meshing splines 50 on the axle half shaft 48 with splines 52 on the gears 46.

FIG. 1 depicts a coupling mechanism for selectively locking and unlocking the differential gears 44, 46. The coupling mechanism may comprise an actuating component. In certain embodiments, the actuating component is an electromagnetic solenoid having a ring shaped housing 54 located over one of the axle half shafts 48, which is also shown in FIG. 2. The housing 54 encloses an electromagnet 56. As more clearly shown in FIG. 3, the electromagnet 56 comprises a coil 58, a coil housing 60 and an actuator 62. The coil 58 comprises multiple wire windings within the coil housing 60. The wire windings are connected to a source for electricity (not shown).

Figure 4:
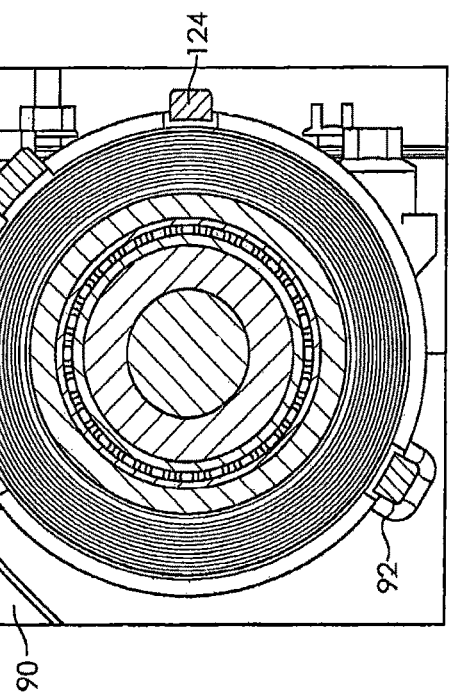
FIG. 4 is a side elevational view taken along section line 4-4 of FIG. 2, showing a portion of the driveline system of FIG. 2 including an electromagnetic solenoid having a housing in a driveline housing.

The housing 60 may be a stationary, two piece housing. A first piece 64 of the housing 60 may be C-shaped and the second piece 66 may have a rectangular cross-section. As shown in FIG. 4, the housing 60 may have a groove 68 defined in an outer wall 70 of the housing 60.

The actuator 62 may be located between the housing 60 and the coil 58. The actuator 62 may be constructed of a metallic material, such as steel, that is susceptible to magnetic forces. The actuator 62 is generally ring-shaped enabling it to encircle the axle half shaft 48.

The actuator 62 may be connected to, or in direct contact with, a pressure plate 72. The pressure plate 72 is also generally ring-shaped so that it too can encircle the axle half shaft 48. The actuator 62 may be unitary, one piece and integrally formed.

The pressure plate 72 is sandwiched between the actuator 62 and a sliding member 74. The actuator 62 may directly contact the pressure plate 72, which may directly contact the sliding member 74. The pressure plate 72 may be unitary, one piece and integrally formed.

In the depicted embodiment, the sliding member 74 may have an L-shaped cross-section. The sliding member 74 may be unitary, one piece and integrally formed. A first leg 76 of the L may be selectively connected to, and in directly contact with, the pressure plate 72. A second leg 78 of the L may have an outer portion 80 connected to the first leg 76. The second leg 78 may also have an inner portion 82 with a set of teeth 84 formed thereon. As shown, the set of teeth 84 axially extend from the inner portion 82 of the second leg 78.

The set of teeth 84 on the second leg 78 may selectively engage with a set of teeth 86 on one of the side gears 46. In a non-limiting example, the set of teeth 86 axially extend from the one of the side gears 46. More particularly, when electricity is provided to the electromagnet 56, it creates a magnetic flux in the coil 58. Almost instantaneously, the magnetic flux urges the actuator 62 to move in the axial directly toward the differential case 34. The actuator 62 axially moves the pressure plate 72, which axially moves the sliding member 74. The teeth 84 on the sliding member 74 engage with the teeth 86 on the side gear 46, which locks the side gear 46 and prevents its rotation. In this mode, the differential is locked and torque flows equally through the differential to both axle half shafts 48.

When the differential is to be unlocked, power is interrupted to the electromagnet 56. A biasing member (not shown) urges the sliding member 74 away from the differential side gear 46. When the teeth 84 of the sliding member 74 are no longer engaged with the teeth 86 of the differential side gear 46, torque may flow through the differential to provide rotation to the axle half shaft 48, and thus the wheel/tire connected to it, with the greatest traction.

FIGS. 1 and 2 depict an interior view of the differential housing 22. A first axially inwardly extending retention feature 88 may be integrally formed, unitary and one piece with a first mounting structure 90. In the embodiment shown, the first mounting structure 90 is an interior wall of the differential housing 22. A second retention feature 92 may also be provided with the first mounting structure 90. It should be appreciated that each of the retention features 88, 92 may be at least one boss, tab, or other retention device, and the like, for example. It should also be appreciated that each of the retention features 88, 92 may be integrally formed with the mounting structure 90 as a unitary piece or as separate and distinct components if desired. The two retention features 88, 92 may be axially aligned with one another, thus they are coplanar with one another.

Each retention feature 88, 92 may have such as a C-shaped cross section. As more clearly shown in FIG. 2A, each retention feature 88, 92 defines a first arm 94 extending from the mounting structure 90 adjacent where the retention feature 88, 92 is connected to the mounting structure 90. Each retention feature 88, 92 also defines a second arm 96 extending from the first arm 94 and a third arm 98 extending transverse the second arm 96.

In the depicted embodiment, the first and third arms 94, 98 are parallel one another and extend in the same direction. The third arm 98 is axially separated from the first arm 94 by the second arm 96 to create a fixed distance gap 100 between them. Together, the first, second, and third arms 94, 96, 98 form a groove 102. The third arm 98 and the first arm 94 may partially overlap one another in the axial direction.

The first arm 94 has a first length 104 and the third arm 98 has a length 106 that may be less than the first length 104.

The third arm 98 has an inner side 108 facing the first arm 94 and an outer side 110 opposite the inner side 108. The inner side 108 and the outer side 110 define a constant thickness between them.

The third arm 98 has an end portion 112 opposite where the third arm 98 connects with the second arm 96. A non-magnetic material 114 may be located between the end portion 112 of the third arm 98 and the coupling mechanism, and more particularly, the electromagnet housing 60. In the depicted embodiment, shown in FIG. 2A, the non-magnetic material 114 may cover the end portion 112 of the third arm 98. The material 114 may be any suitable non-magnetic material 114 as desired such as plastic, ceramic, rubber, and/or fibrous material, for example. The material 114 reduces, or prevents, magnetic flux from flowing through the coil 58 to the mounting structure 90 or differential case 34.

The non-magnetic material 114 may have a C-shaped cross-section. The C-shape may be comprised of a first leg 116, a second leg 118, and a third leg 120. The second leg 118 may be transverse the first and third legs 116, 120. The first leg 116 may be parallel and adjacent the inner side 108 of the third arm 98. The second leg 118 may be parallel and adjacent an end wall 122 of the third arm 98. The third leg 120 may be parallel and adjacent the outer side 110 of the third arm 98.

Figure 3:
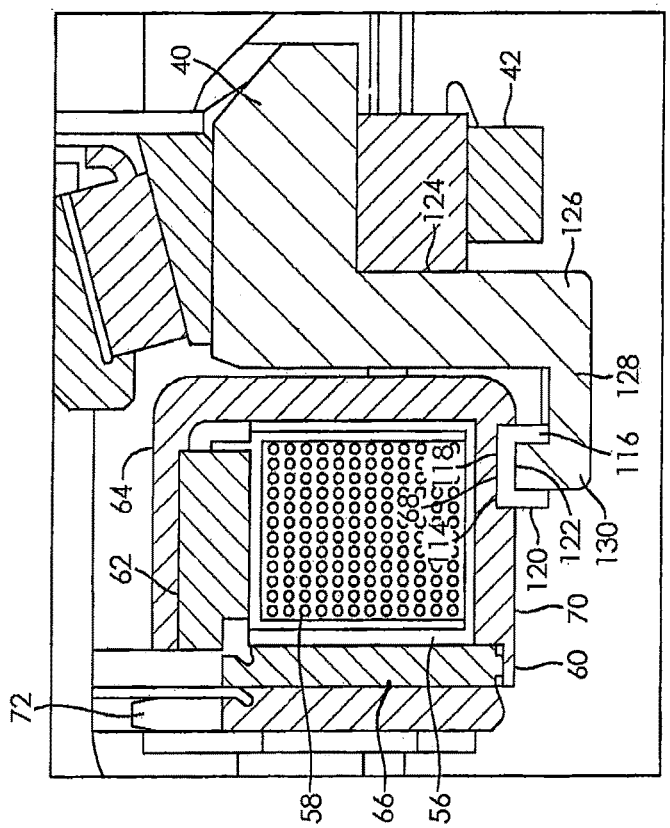
FIG. 3 is an enlarged detail top view of a portion of the driveline system shown within circle 3 of FIG. 1.

As shown in FIG. 3, another retention feature 124 may also be formed with a second mounting structure. It should be appreciated that each of the retention feature 124 may be at least one boss, tab, or other retention device, and the like, for example. In certain embodiments, the second mounting structure may be one of the bearing caps 40. The one of the bearing caps 40 may be provided with the retention feature 124 may be integrally formed therewith, as a unitary and one piece structure. The retention feature 124 may include first, second and third arms 126, 128, 130. These arms 126, 128, 130 may be the same shape and size of the respective arms 94, 96, 98, extending from the differential housing 22.

Preferably, the same type of non-magnetic material 114 noted above is located between the third arm 130 of the bearing cap 40 and the coupling mechanism, and more particularly, the electromagnet housing 60. Most preferably, the material 114 with a first leg 116, second leg 118, and third leg 120, as described above, is located about the third arm 130 in the groove 102 of the housing 60.

As shown in FIG. 4, it is preferred that the retention features 88, 92 of the differential housing 22 and the retention feature 124 of the bearing cap 40 are equally spaced around the circumference of the electromagnet housing 60. By spacing them about the electromagnet housing 60, the retention features 88, 92 securely retain the housing 60 and prevent radial and axial movement of the housing 60.

In each case, the retention features 88, 92 of the differential housing 22 and the retention feature 124 of the bearing cap 40, and the non-magnetic material 114, are at least partially located in the groove 68 of the housing 60. By locating the retention features 88, 92, 124 in the groove 68, the retention features 88, 92, 124 abut the walls of the groove 68 to prevent relative motion of the housing 60.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A retention system, comprising:
   at least one mounting structure having at least one retention feature provided therewith; and
   an electromagnetic solenoid configured to cooperate with the at least one retention feature to maintain a position of at least a portion of the electromagnetic solenoid relative to the at least one mounting structure, wherein a portion of the at least one retention feature that includes a nonmagnetic material is in contact with the electromagnetic solenoid, wherein the at least one retention feature includes a first arm, a second arm, and a third arm, and wherein the first arm has a first length and the third arm has a length less than the first length.

2. The retention system of claim 1, wherein the at least one mounting structure is a differential housing.

3. The retention system of claim 1, wherein the at least one mounting structure is a bearing cap.

4. The retention system of claim 1, wherein the at least one retention feature has a generally C-shaped cross-section.

5. The retention system of claim 1, wherein the first arm extends parallel a portion of the at least one mounting structure adjacent where the at least one retention feature is connected thereto.

6. The retention system of claim 1, wherein the second arm extends transverse at least one of the first arm and the third arm of the at least one retention feature.

7. The retention system of claim 1, wherein the first arm and the third arm of the at least one retention feature are parallel to one another and extend in the same direction.

8. The retention system of claim 1, wherein the third arm is separated from the first arm by the second arm having a gap formed therebetween.

9. The retention system of claim 1, wherein the third arm and the first arm of the at least one retention feature partially overlap one another in an axial direction.

10. The retention system of claim 1, wherein the third arm of the at least one retention feature has an inner side facing the first arm and an outer side opposite the inner side.

11. The retention system of claim 10, wherein the inner side and the outer side of the third arm define a constant thickness.

12. The retention system of claim 1, wherein the electromagnetic solenoid includes a housing having at least one groove formed therein.

13. The retention system of claim 12, wherein at least a portion of the at least one retention feature is received in the at least one groove of the electromagnetic solenoid.

14. The retention system of claim 1, wherein the at least one retention feature militates against at least one of a rotational movement and an axial movement of the electromagnetic solenoid.

15. The retention system of claim 1, wherein the non-magnetic material is one of integrally formed and disposed on the portion of the at least one retention feature.

16. A retention system, comprising:
   at least one mounting structure having at least one retention feature provided therewith; and
   an electromagnetic solenoid configured to cooperate with the at least one retention feature to maintain a position of at least a portion of the electromagnetic solenoid relative to the at least one mounting structure, wherein a portion of the at least one retention feature that includes a nonmagnetic material is in contact with the electromagnetic solenoid, and wherein the nonmagnetic material has a generally C-shaped cross-section.

17. A retention system, comprising:

at least one mounting structure having at least one retention feature provided therewith; and an electromagnetic solenoid configured to cooperate with the at least one retention feature to maintain a position of at least a portion of the electromagnetic solenoid relative to the at least one mounting structure, wherein a portion of the at least one retention feature that includes a nonmagnetic material is in contact with the electromagnetic solenoid, wherein the nonmagnetic material has a generally C-shaped cross-section, and wherein the nonmagnetic material includes a first leg, a second leg, and a third leg.

\* \* \* \* \*